United States Patent
Goel et al.

(10) Patent No.: US 11,379,281 B2
(45) Date of Patent: Jul. 5, 2022

(54) DETECTION AND OPTIMIZATION OF CONTENT IN THE PAYLOADS OF API MESSAGES

(71) Applicant: Akamai Technologies Inc., Cambridge, MA (US)

(72) Inventors: Utkarsh Goel, San Mateo, CA (US); Martin T. Flack, Denver, CO (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 16/951,685

(22) Filed: Nov. 18, 2020

(65) Prior Publication Data

US 2022/0156132 A1    May 19, 2022

(51) Int. Cl.
*G06F 9/54* (2006.01)
*G06N 7/00* (2006.01)

(52) U.S. Cl.
CPC .............. *G06F 9/547* (2013.01); *G06F 9/546* (2013.01); *G06N 7/005* (2013.01)

(58) Field of Classification Search
CPC .......... G06F 9/547; G06F 9/546; G06N 7/005
See application file for complete search history.

(56) References Cited

U.S. PATENT DOCUMENTS

| | | | |
|---|---|---|---|
| 6,108,703 A | 8/2000 | Leighton et al. | |
| 7,058,706 B1 | 6/2006 | Iyer et al. | |
| 7,096,263 B2 | 8/2006 | Leighton et al. | |
| 7,096,266 B2 | 8/2006 | Lewin et al. | |
| 7,240,100 B1 | 7/2007 | Wein et al. | |
| 7,251,688 B2 | 7/2007 | Leighton et al. | |
| 7,274,658 B2 | 9/2007 | Bornstein et al. | |
| 7,293,093 B2 | 11/2007 | Leighton et al. | |
| 7,484,002 B2 | 1/2009 | Swildens et al. | |
| 7,523,181 B2 | 4/2009 | Swildens et al. | |
| 7,574,499 B1 | 8/2009 | Swildens et al. | |
| 7,603,439 B2 | 10/2009 | Dilley et al. | |
| 7,688,753 B1 * | 3/2010 | Zimran | G06F 3/067 370/252 |
| 7,716,367 B1 | 5/2010 | Leighton et al. | |

(Continued)

OTHER PUBLICATIONS

U.S. Appl. No. 16/706,765, filed Dec. 8, 2019 "Proxy Server Caching of Database Content".

(Continued)

*Primary Examiner* — Tuan C Dao

(57) ABSTRACT

A server in a content delivery network (CDN) can examine API traffic and extract therefrom content that can be optimized before it is served to a client. The server can apply content location instructions to a given API message to find such content therein. Upon finding an instance of such content, the server can verify the identity of the content by applying a set of content verification instructions. If verification succeeds, the server can retrieve an optimized version of the identified content and swap it into the API message for the original version. If an optimized version is not available, the server can initiate an optimization process so that next time the optimized version will be available. In some embodiments, an analysis service can assist by observing traffic from an API endpoint over time, detecting the format of API messages and producing the content location and verification instructions.

20 Claims, 3 Drawing Sheets

(56) References Cited

U.S. PATENT DOCUMENTS

| | | | |
|---|---|---|---|
| 7,725,602 B2 | 5/2010 | Liu et al. | |
| 7,912,978 B2 | 3/2011 | Swildens et al. | |
| 7,925,713 B1 | 4/2011 | Day et al. | |
| 7,996,531 B2 | 8/2011 | Freedman | |
| 8,195,831 B2 | 6/2012 | Swildens et al. | |
| 8,788,577 B2 | 7/2014 | Podjarny et al. | |
| 8,838,657 B1* | 9/2014 | Malone | G06F 16/93 707/790 |
| 8,880,633 B2 | 11/2014 | Brookins et al. | |
| 9,112,826 B2 | 8/2015 | Gero | |
| 9,420,058 B2 | 8/2016 | Leighton et al. | |
| 9,451,000 B2 | 9/2016 | Gero et al. | |
| 9,477,774 B2 | 10/2016 | Conboy et al. | |
| 9,549,022 B2 | 1/2017 | Brookins et al. | |
| 9,654,550 B2 | 5/2017 | Brookins et al. | |
| 9,699,231 B2 | 7/2017 | Gero | |
| 9,736,258 B2 | 8/2017 | Holland et al. | |
| 9,785,621 B2 | 10/2017 | Podjarny et al. | |
| 2004/0059725 A1* | 3/2004 | Sharangpani | G06F 16/90344 |
| 2005/0055399 A1* | 3/2005 | Savchuk | H04L 63/0245 709/230 |
| 2005/0235134 A1* | 10/2005 | O'Sullivan | G06F 9/3004 712/10 |
| 2010/0142516 A1* | 6/2010 | Lawson | H04M 7/0021 370/352 |
| 2011/0246974 A1* | 10/2011 | Kawachiya | G06F 8/4441 717/148 |
| 2013/0311433 A1 | 11/2013 | Gero et al. | |
| 2014/0181186 A1* | 6/2014 | Stevens | H04L 67/02 709/203 |
| 2014/0379823 A1* | 12/2014 | Wilsher | H04L 65/602 709/206 |
| 2015/0128063 A1* | 5/2015 | Jones | H04L 63/10 715/741 |
| 2016/0092036 A1* | 3/2016 | Rodgers | G06F 40/103 715/762 |
| 2017/0093779 A1* | 3/2017 | Taliaferro | H04L 51/18 |
| 2019/0272331 A1* | 9/2019 | Gangadhar | G06F 16/214 |
| 2019/0317970 A1* | 10/2019 | Chung | G06F 16/957 |
| 2019/0354488 A1* | 11/2019 | Gupta | G06F 12/127 |

OTHER PUBLICATIONS

Vargas, S. et al., "Characterizing JSON Traffic Patterns on a CDN,", In Internet Measurement Conference (IMC '19), Oct. 21-23, 2019, Amsterdam, Netherlands, 7 pages.

* cited by examiner

DETECTION AND OPTIMIZATION OF CONTENT IN THE PAYLOADS OF API MESSAGES

BACKGROUND

Technical Field

This patent document generally relates to the optimization of content that is embedded in API messages.

Brief Description of the Related Art

Hypertext markup language (HTML) is a well-documented standard that provides specific mechanics for inlining and referencing certain kinds of content in the HTML, such as images, JavaScript (JS), Cascading Style Sheets (CSS), URLs, and otherwise. Using these mechanics, CDNs and other intermediaries have built services to optimize HTML messages along with the content that is inlined/referenced within. For example, U.S. Pat. No. 8,788,577, owned by the assignee hereof, describes methods and systems for automated analysis and transformation of web pages; see also U.S. Pat. No. 9,785,621, the contents of both of which are hereby incorporated by reference.

An increasing share of traffic on the Internet is related to application programming interfaces (APIs), as shown by Vargas et al., "Characterizing JSON Traffic Patterns on a CDN" IMC '19, Oct. 21-23, 2019, Amsterdam, Netherlands, pp. 195-201. APIs offer a wide range of services to end-users and devices. On the Internet, APIs are reachable via an API endpoint, which is typically in the form of a URL, such as api.example.com/endpoint123/. A client device, whether operated by a human or running automated routines, can send requests for service to the API endpoint. Such requests often include a set of input parameters. The API typically responds with a message having a payload that inlines or references certain content. However, unlike HTML, APIs do not have standards in place to recommend how API messages should be developed, what kinds of content they can inline/reference, what criteria must be satisfied before content is inlined/referenced, and how that content should be accessed by client applications. The lack of such standards has allowed API developers to be independent and flexible in how they build and structure API messages and the associated payloads. For example, two API payloads may inline or reference exactly the same information but may be structured differently. Similarly, the same API payload can be structured in many different ways.

APIs typically (but without limitation) use an HTTP messaging format. An API message over HTTP/1.x can have a start-line, one or more headers and can have a payload (the term "payload" is sometimes referred to as a "body"; the terms are equivalent and have no difference in meaning for purposes hereof). Similarly, HTTP/2 and later versions can have one or more headers (some of the headers containing information previously provided in the start-line) and a payload. APIs often convey the message payload using data-interchange formats, such as JSON, CSV, or XML. While such data-interchange formats may define some aspects of a payload, an API may inline many different types of content, in a variety of ways. For example, while JSON is structured as key-value, there is no standard on the number or naming of key-value pairs, where in the payload they can be placed, or how many there can be. As mentioned above, the client is assumed to know how to extract the content. Generalizing, unlike the HTML specification, API messages use arbitrary formats to inline or reference content, in that there is no standard on how or where to put a particular instance of content into the message. There are numerous ways to do so.

APIs fill payloads with not only plain-text strings, numbers, and booleans into API messages, but also JSON, XML, comma separated values (CSV), tab separated values (TSV), images, JavaScript, CSS, HTML, and other types of content in arbitrary places. This makes it difficult for CDNs and other intermediaries to optimize the API messages. For example, it is known in the art for an image optimization service offered by a CDN to optimize an HTML document that contains image bytes in its entirety (i.e., an inlined image). However, the same service cannot optimize image bytes that are inlined in the payload of an API message because both the existence and specific location of the image bytes in the payload are unknown to the CDN software, being typically proprietary to the API solution. Generalizing, a CDN cannot apply known optimization techniques to a wide range of content types in API messages because it cannot locate or verify instances of such content.

While a CDN could be manually configured with knowledge of the message format used by each API being handled on the CDN, such an approach would require immense resources and soon be out of date, as APIs are continually being changed and new APIs are being deployed.

This patent document addresses the technical challenges inherent in optimizing and serving content embedded in API traffic on the Internet. This patent document discloses novel ways for a CDN to detect and optimize arbitrarily inlined/referenced content in API payloads, including but not limited to, images, HTML, JS, CSS, URLs. In this way, the teachings herein increase the efficiency and utility of network communications and Internet content delivery systems.

More information about CDN technologies, including examples of request routing mechanisms using DNS and otherwise, as well as proxy server technologies, can be found in the following documents, the teachings of which are hereby incorporated by reference in their entirety: U.S. Pat. Nos. 6,108,703; 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

The teachings presented herein improve the functioning of a computer system itself, improving the caching function in an individual server as well as that of a larger distributed system comprised of many such servers. Those skilled in the art will understand these and other improvements from the teachings hereof.

BRIEF SUMMARY

This section describes some pertinent aspects of this invention. They are illustrative, not exhaustive, and they are not a definition of the invention. The claims of any issued patent define the scope of protection.

A server in a content delivery network (CDN) can be configured to examine API traffic and extract therefrom content of interest, e.g., content that can be optimized in some way before being delivered to a client. Given an API message received from a particular API, a CDN server can use content location instructions for that API to find one or more instances of inlined content in the API message that can be optimized. Typically, but without limitation, such instances of inlined content are found in the payload of the API message. The content location instructions specify how to find the content given the arbitrary format of the API message.

Upon locating what appears to be an instance of inlined content that can be optimized, the CDN server can verify the identity of the content by applying a set of content verification instructions associated with the API. If the identity of the content can be verified (e.g., the content represents image 'xyz') the CDN server can retrieve an optimized version of the identified content and swap that version into the API message, removing the original content. If an optimized version is not available, the CDN server can initiate a content optimization process. Typically such a process is performed out of band, so that next time the optimized version will be available in cache or other repository. However, the optimization process could be done on the fly if doing so did not unacceptably delay the delivery of the API message to the client.

In some embodiments, an analysis service can assist the CDN server by observing traffic from an API over time and detecting the format of API messages emitted therefrom, including the location of inlined content therein that could benefit from optimization. From this intelligence, the aforementioned content location and content verification instructions can be generated for the CDN server. These instructions can be prepared in advance, and they can be relatively streamlined, so that the CDN server can apply them quickly. Moreover, the analysis service can develop a confidence score indicating the confidence that a given API message from the API's endpoint truly will conform to the predicted format and contain the inlined content of interest at the designated location. Using this confidence score, the server can decide in real time whether to incur the computing cost (e.g., latency, processing load) needed to attempt to locate and verify the inlined content in the API message, as compared to the benefit that an optimized version of content would provide.

The claims are incorporated by reference into this section, in their entirety.

BRIEF DESCRIPTION OF THE DRAWINGS

The invention will be more fully understood from the following detailed description taken in conjunction with the accompanying drawings, in which.

Figure 1A:
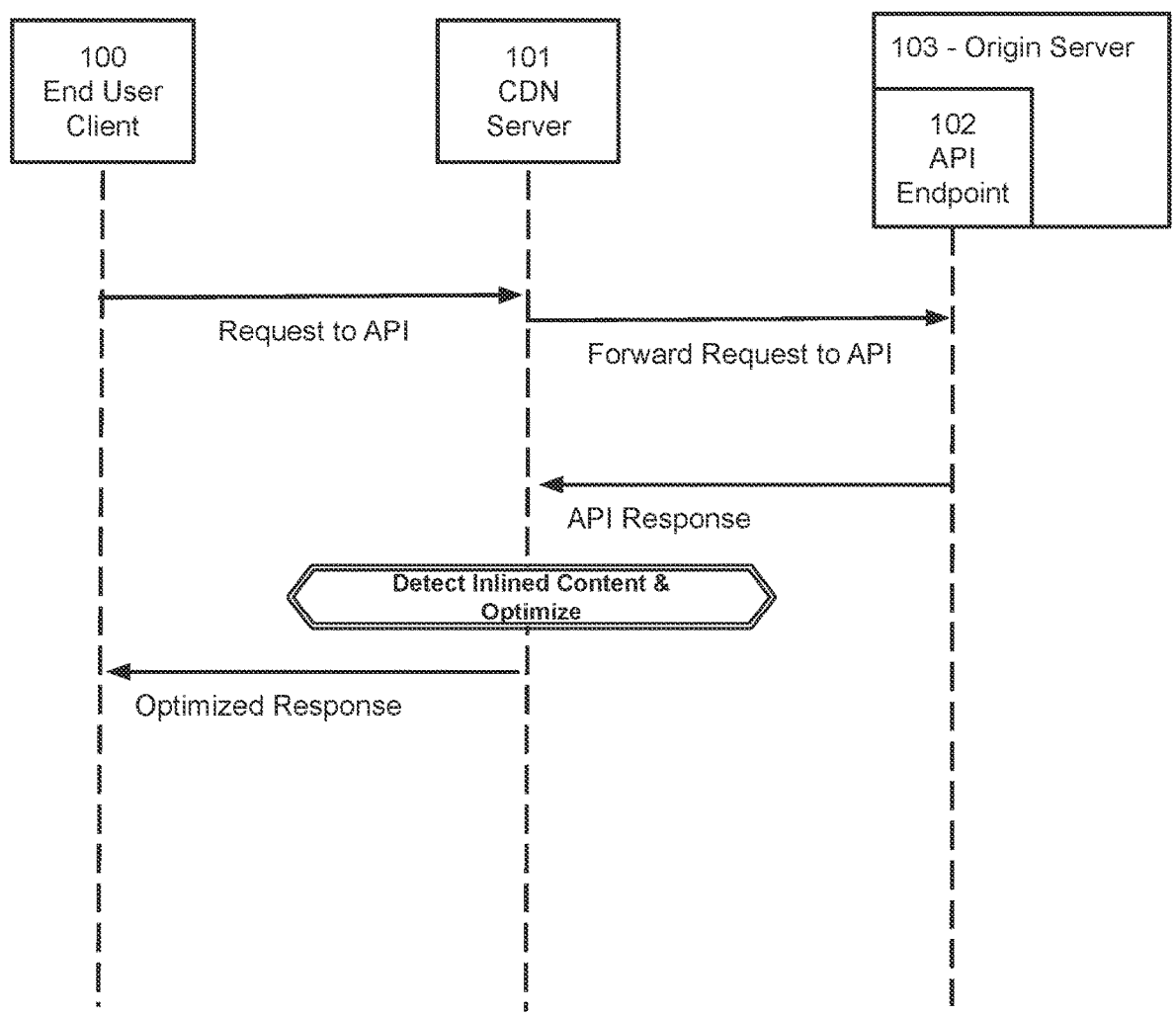
FIG. 1A is a diagram showing how a CDN server can optimize content in API response messages, in accordance with one embodiment of the invention.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this patent document and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, JS, HTTP versions 1.1 and 2, HTTP over QUIC, MQTT, TCP/IP, and UDP, is assumed. Likewise, basic familiarity with well-known data-interchange formats, such as JSON, CSV, XML, is assumed.

All references to HTTP should be interpreted to include an embodiment using encryption (HTTP/S), such as when TLS secured connections are established. The terms "client" and "client device" are used herein to refer to hardware in combination with software (e.g., a browser or player application). While context may indicate the hardware or the software exclusively, should such distinction be appropriate, the teachings hereof can be implemented in any combination of hardware and software. Hardware may be actual or virtualized.

The term "optimize", as in optimizing content, does not necessarily mean reducing the size of an instance of content to the smallest possible size, or creating the absolute maximally efficient or effective version of content. Optimization refers to changing content to improve or enhance a relevant aspect of its delivery, display, and/or use. It may include producing a version of content adapted to the capabilities/attributes of a given end-user client device that requested it, network quality between the client and a CDN server, or an attribute/preference of the end-user. It may include compressing content (not limited to GZip or Brotli, but including new compression formats such as Concise Binary Object Representation (CBOR)), minifying content, or removing unnecessary data from content. The choice of a given compression level in certain algorithms may be made to compress at the highest level; or lower than the highest possible level in order to manage system resources or to expedite completion time. It may include rearranging or otherwise modifying data in content so that it can be processed by a client application in a more efficient way or presented to a user more effectively. It may include hinting for download or pushing the client device of possible resources that the client may need in the near future. Hence a wide range of modifications that improve or enhance content to some degree can be considered optimizations. The degree of improvement or enhancement may vary widely. Sometimes, only a small degree of improvement is achievable given other system constraints, design goals; in other situations, a considerable performance improvement might be gained. Occasionally, the optimization system may experience an instance where optimization "fails" in the sense that, e.g., the resultant file size was expected to be smaller but is larger due to the natural operation of the algorithm applied; in some embodiments this may be detected and the optimization withdrawn.

As noted in the Background, an API message may be formatted as an HTTP message with a start-line, header(s) and payload (body), but this is not necessary. A variety of formats can be used for application layer messaging. And an API message may be considered a payload or body without necessarily being HTTP.

The following description talks about instances of inlined or referenced content in the payloads of API messages. Here is a non-limiting example of a payload of an API message that is formatted using JSON:

```
{
  "productName": "Marker Pens",
  "productSKU": 123456,
  "imageUrl": "https://examplecustomer.com/products/123456",
  "imageData":
"data:image/png;base64,932jdDJOIDo9m3dmO(JD0ou3kmi393d8
mijdkm3j3oihdkid9ki3dki3dkiDkieki3....",
  "imageClick": "app://<openInstalledApp>",
  "widget": {
    "header": "Email Registration Error",
    "stylesheet": "https://examplecustomer.com/css/file1.css",
    "customStyle": "#header { background: #f0f007;
blue; }",
    "JSSnippet": "var userProfile=getUUID( );function
loadErrorMessage( ){if(errorCode==1) {displayAlternative( )} else
{exitPage(1);} }",
    "structure": "<div><span>Please check your email
address</span><br/><span>Click <a href='somelink'>here</a> to
recover password</span></div>"
  },
  "userActionJS": "delete renewProfile.user;var
initSession=document.location;"
}
```

The above JSON-formatted payload has several instances of inlined content: a PNG image referred to as "imageData", a script named "JSSnippet" and another script named "userActionJS", HTML, named "structure", CSS named "customStyle", and multiple URLs (such as "ImageURL", "stylesheet"). Each of the multiple URLs may point to additional content, and that linked content can be considered to be 'referenced' in the payload of this API message.

Each of the aforementioned instances of inlined or referenced content is of a type that can be optimized by CDN servers. How to do so will be described below. It is noted that the term "inlined" content is sometimes referred to as "embedded" content; the terms are equivalent and have no difference in meaning for purposes hereof.

1.0 Overview

The embodiments described in the following sections assume an API that provides a service and is reachable at an associated API endpoint (e.g., a URL with hostname and path). FIG. 1 illustrates a basic arrangement, in which a client 100 issues a request to the API running on the origin server 103. The request is received by the CDN server 101 and proxied forward to the API endpoint 102 hosted on the API's origin server 103. The API endpoint 102 responds with an API message ("API response") for delivery to a client 100.

The example of FIG. 1A shows how an API message may be a response to a previous request made by the client to the API. It should be noted that, in alternative embodiments, the API origin server 103 may send an API message without the triggering client request shown in FIG. 1A. In other words, the API message emitted by the API may be initiated by an out of band process or due to some predetermined schedule or conditions.

Upon the CDN server 101 receiving the downstream API response message, the CDN server 101 can attempt to optimize content in the payload. In general this process can involve locating any instances of inlined or referenced content in the API payload that can be optimized, verifying the identity of such content, and swapping optimized versions of the content for the original versions thereof. The computing work needed for the CDN server to know how to locate and verify and otherwise optimize instances of inlined or referenced content can be performed on-the-fly at the time of receiving and scanning the response. Alternatively, such work can be done in advance by another service, or a combination of the two, so that such content location and/or verification instructions can be developed and available in advance.

For convenience of description, the following sections focus on the optimization of instances of inlined content. The optimization of instances of referenced content is addressed afterwards.

2.0 on the Fly Detection and Optimization

On-the-fly detection and optimization refers to a CDN server performing the detection and optimization of content inlined in an API message as it is received from the API for delivery to a client, without previously developed knowledge or instructions for messages from that API. This means that the API message can be optimized even if it is the first time that such a message has been encountered.

On-the-fly detection and optimization at a CDN server can be problematic because it slows the response time to the client. Nevertheless, in certain cases, such as where an API payload is smaller than specified size (e.g., a configured number of bytes), where the API payload is not cacheable on the CDN, or its structure changes frequently, on-the-fly optimization may be worthwhile. A configuration installed on the implementing CDN can evaluate such factors and determine whether an on-the-fly approach should be taken.

The process for on-the-fly optimization can proceed as follows.

2.1 Detect Format

First, the CDN server would detect the format of the API message payload. For example, whether a payload is structured as a JSON object, as an XML object, a delimiter-separated-value format (e.g., comma-separated, CSV, or tab-separated-values, TSV), or some other data-interchange format. To detect the format of the payload, the implementing CDN could check for the presence of the content-type response header from the origin. Alternatively, the entire or parts of the payload could be checked for syntactical validations for (without limitation) a JSON object, followed by a check for an XML object, followed by a check for a valid CSV, and so on.

2.2 Detect Inlined Content that can be Optimized

Once the format of the payload is detected, next the CDN server can parse the structure and iterate over all fields in that format to check for the presence of a mime-type of interest. For example, if a payload is structured as a JSON object, the server can iterate over all key-value pairs, including array elements, nested objects, and arrays or objects quoted as strings. If the payload is structured as XML, iterate over all child tags. If the payload is a CSV, iterate over all delimiter-separated fields.

While iterating over the payload, the CDN server may scan for instances of inlined content pertaining to one or more of the following mime-types: base64 encoded image bytes, JavaScript, HTML, CSS, URLs, etc. For each of the scanned bytes, the CDN server can perform a series of operations to check whether the scanned bytes contain one of these mime-types of interest. Below are a few example ways on how content can be classified into different mime-types:

- Base64 encoded images start with data:image/<format>; base64 The presence of this string at the start can be used to detect the presence of inlined images.
- HTML detection can be performed by first making sure that the payload has a valid HTML syntax, followed by checking for the presence of valid HTML tags. For example, <xyz></xyz> is syntactically correct but is not valid HTML. A W3C HTML validator could be utilized for the most accurate validation.
- CSS could be detected by first checking for syntactical errors, followed by checking for allowed CSS rules. For example, a {color:hello;} is a syntactically correct CSS but hello is not a valid CSS color. For the most accurate validation, a CSS validator service/tool such as that offered by the W3C (which is currently named Jigsaw) can be used.
- For detecting JS, the payload could be passed through a JS parser, such as esprima, to check for valid JS code. Since a JS parser would treat strings and numerals as valid JS bodies, the payload should be passed through a second check to detect the presence of popular JS keywords, such as var, let, const, function, module.exports, console.
- For detecting URLs in the payload, a regex could be developed to detect HTTP, HTTPS, APP, WEBPACK, and other URLs.

For payloads that don't directly match one of the above mime-types, it is possible that the payload is base64 encoded. To check if that is the case, the payload can be base64 decoded and then re-encoded as base64 and the final output is compared with the original payload. If the two match, then the payload is base64 encoded and should be decoded and checked for the presence of the valid image, CSS, HTML, or JS bytes (using the processes already mentioned above).

When the CDN server needs to iterate over a payload, it may keep a byte count of each of the various mime-types that are inlined in the payload (e.g., plain-text strings, boolean, and numbers). Doing so enables new kinds of optimizations, such as compressing with algorithms that are suited to the content type in the payload (discussed further below in additional use cases section).

2.3 Extract Inlined Content

If an instance of inlined content is detected, the implementing CDN can extract the corresponding bytes for further processing if the configuration allows. For example, certain types of content in the API payload may be disallowed for further processing or only a limited number of instances of inlined content may be allowed for processing at a time.

2.4 Verify Identity of Inlined Content and Check Cache for Previously Generated Optimized Version Thereof The goal of content verification is to ensure with a high degree of confidence that the inlined content found in the payload of a given API message payload is identical to the original version of inlined content which was previously optimized and cached. In other words, that there is a shared identity between the two.

Specifically, a hash of the extracted bytes could be compared with the hash of the objects currently cached on the CDN to check whether the extracted bytes are already optimized and available in the cache. (Note that optimized versions of the inlined content could have metadata indicating the hash of the original, for comparing to the extracted bytes.) If the bytes are already optimized, the CDN server can replace the extracted bytes with the optimized bytes in the payload and then transmit the API message to the client.

Alternatively, the position of the extracted bytes in the payload could be used as an indicator and compared against position information that is associated with optimized cached versions thereof. (In other words, the optimized instances of inlined content can be associated with position information indicating where the original inlined content—from which the optimized version was created—had been located in the payload from which they were extracted.) Such positioning information may include one or more of the following: byte-ranges, key names in the case of JSON payload, row and column numbers in the case of CSV payload, tag names in the case of XML, or the subpath in the structured payload where the bytes were extracted from.

2.5 Transmit to Optimization Service

If the extracted bytes corresponding to an instance of inlined content are not found in the cache of the CDN server, then they are transmitted to another service where appropriate optimization can be applied. This process could be a separate process running on the CDN server handling the API traffic (CDN server 101), or a process running on another machine in the CDN. Information about the API and/or client device may be included with the transmission.

There may be many optimization services depending on content type. For example, if the extracted bytes contain base64 encoded image bytes, an image optimizing service could be utilized. If the extracted bytes represent HTML, JS, or CSS, the bytes could be sent to a front end optimizing (FEO) service that can remove whitespace and minify the payload.

In the "cache-miss" scenario, the CDN server can wait for the optimized objects to return from the optimization service, or it can send the API message with un-optimized objects to the client and cache the optimized versions when they return from the optimization service. The CDN server may choose to cache the optimized bytes depending upon how frequently the bytes are requested by various clients. The verification metadata previously described in 2.4, such as the hash of the original inlined content and position information, can be stored with this optimized version.

2.6 Optimization Service

An optimization service can optimize an instance of inlined content based on a number of factors, including but not limited to the client device's capabilities, network characteristics and metrics, and the size of the extracted bytes. A variety of such techniques are known in the art. The teachings hereof are agnostic to the optimization routines that are used. Some examples of optimization routines are provided below:

- When the detected mime-type is an image, the image can be sent to an image optimizing service (IOS) to optimize the base64 encoded image bytes. The CDN server typically also transmits metadata that may be useful to the IOS for optimization, for example: the original headers of the request generated by the client and any configuration that applies to optimizing the payload. IOS may first convert the base64 encoded image bytes to an image and then apply optimization as per the customer configuration, or optimize the base64 encoded bytes directly. The optimized bytes can be cached on the image optimizing service along with any metadata that can assist the service to prevent re-optimizing, including information such as the entire incoming base64 encoded image bytes, hash of the base64 encoded bytes, hash of the first N bytes of the base64 encoded bytes, the request URL indicating the API endpoint, and position of the inlined image. The optimized image returned by the image optimizer to the CDN server can then be injected into the payload replacing the image bytes originally inlined therein.

If the detected mime-types are either of HTML, CSS, or JS, such content could be passed to front end optimization (FEO) service for removal of white spaces or for minification. The service typically refrains from minifying JS bodies as it is prone to change variable names that can break the page's functionality when executed together with other JS on the page.

If the detected type of content is a URL, the CDN server can check its configuration for the API endpoint to decide whether or not it can perform an HTTP/2 push, send HTTP headers to perform a preload or a preconnect on the client for the resource associated with the URL. Alternatively, it could consult the configuration for whether or not to expand the inlined URL(s) into the actual content bytes, or optimized versions thereof, using the data URI format.

3.0 Offline Detection & Optimization

API payloads can also be scanned and optimized by an offline analyzing service (OAS) to prepare in advance instructions on locating and verifying objects in the API payload. This can reduce the response time and operational costs needed to perform the same job on-the-fly. This scenario is shown generally at FIG. 1B.

3.1 Offline Analyzer Service

Figure 1B:
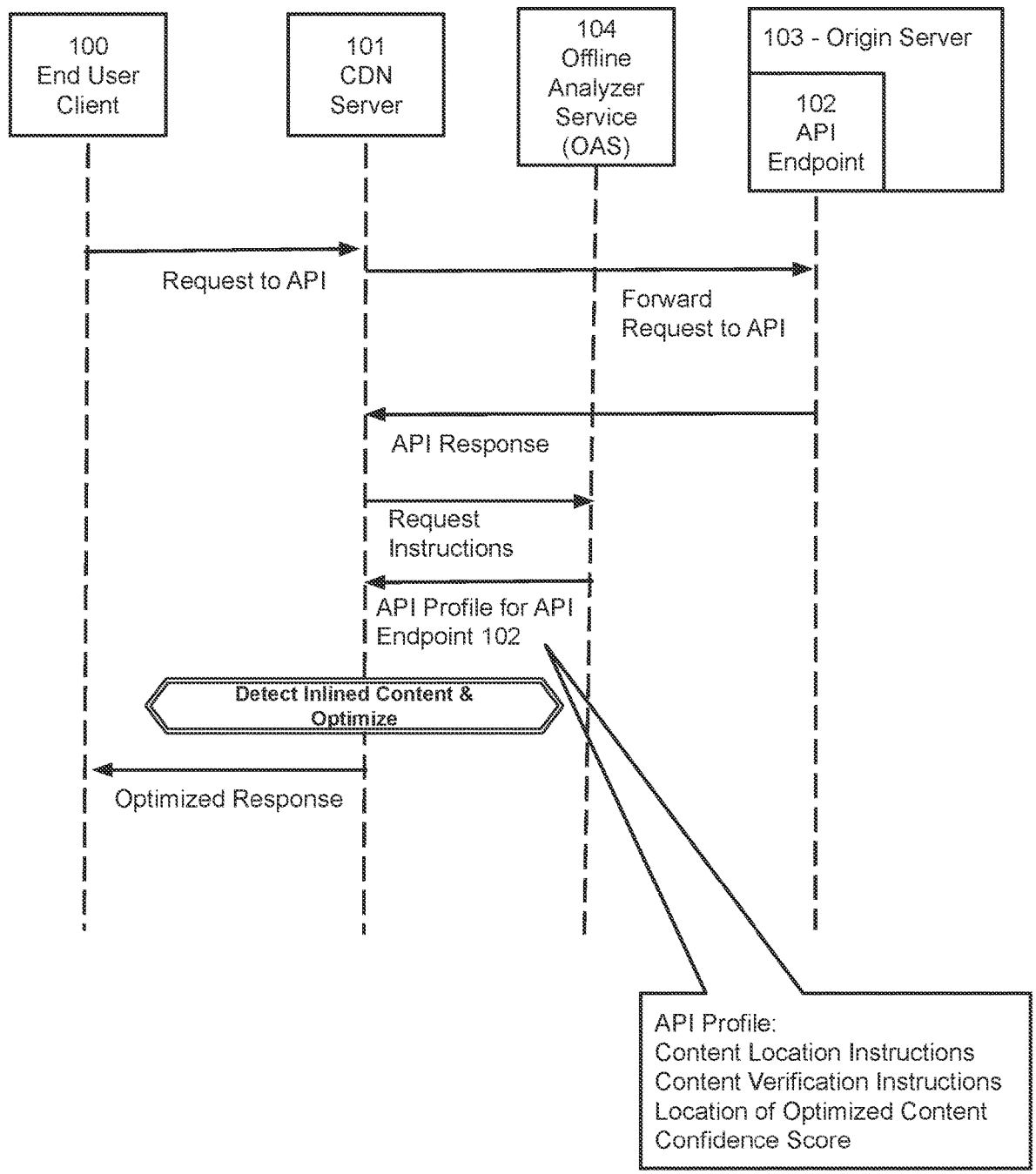
FIG. 1B is a diagram showing how a CDN server can optimize content in API response messages, in conjunction with an Offline Analysis Service (OAS), in accordance with one embodiment of the invention; and, FIG. 2 is a block diagram illustrating hardware in a computer system that may be used to implement the teachings hereof.

With reference to FIG. 1B, an offline analyzing service (OAS) 104 can be introduced into the system, to sample requests to and responses from an API endpoint. The OAS can sample traffic related to some or all of the API endpoints under a domain name. The OAS can then perform inspection of the payload in API response messages, first to detect the format and then to detect any instances of inlined content that potentially could be optimized, as described earlier (e.g., in Sections 2.0, 2.1 and 2.2 and otherwise above). Running the checks and routines described above can take significant time, so by using the OAS, they are done offline. The OAS 104 can also extract and initiate optimization of any instances of inlined content that it finds, e.g. in the manner described earlier (e.g., in Sections 2.5 and 2.6 above).

As the OAS continues to sample API requests and responses, OAS builds an API profile relating to the nature of the responses returned from a given API endpoint (essentially metadata for an API endpoint). For example, OAS may learn over time that a given API endpoint always returns a JSON formatted payload, that it includes at least one key-value pair whose value is base64 encoded image bytes or some other mime-type content bytes, that the detected inlined content never changes in position, byte size, or value, or that it changes only under certain conditions, for example certain end-user device identifiers, or geographic locations. The profile may also include a hash of an entire API message and a hash of the first X bytes of the inlined content detected therein.

The OAS provides such profiles to the CDN server either periodically or upon request, which can assist the CDN server to speed up optimizing the payload. Here is an example of the kind of information that can be captured in an API profile, and how a CDN server can use it.

API Profile {
   API endpoint: the API location (e.g., URL) to which this profile pertains.
   Content Location Instructions: instructions that tell the CDN server how to quickly find one or more instances of inlined content that could be optimized in API message payloads from the API endpoint. Multiple sets of instructions may be included, the selection of a particular set may depend on the client device, geography, request parameters, or other attributes of the client request. The content location instructions can include directives to go to certain byte ranges and/or byte offsets with sizes, to quickly locate a blob of data that is likely to be an instance of inlined content that can be optimized. The content location instructions could also be in the form of position information as described in 2.4 above (e.g., key names, row/column numbers, tag names, subpath, JSON Path instructions, jq instructions, XPath instructions) that the CDN server should search for in the payload, and extract the corresponding data.
   Content Verification Instructions: instructions that tell the CDN server how to verify the identity of each of instances of inlined content, that is, that the blob of data it located via the content location instructions really is the same as the content that the API profile intended to find, per section 2.4 above. These instructions can include instructions to perform a hash of the located bytes and the expected hash thereof, for comparison. It can also include a reference to the position information.
   Applicable Optimization: the type of optimization that could be applied to the content, e.g., compression, device adaptation, and so on.
   Updates to Content Metadata: changes to the information in the payload (such as metadata) that may be necessary to accurately describe the optimized content. For example, an an embedded image [foo-image-data] may be introduced in the payload with the metadata {image: {size: 123456, width: 100, height: 100, colors: 256, data: [foo-image-data]", }}, where [foo-image-data] is the image data. Upon optimization of [foo-image-data], the size, width, height, colors, etc. needs to be updated. Alternatively, instead of inlined image data, the image could be referenced by URL, and metadata in the API response would still need to be updated. In either case, the content metadata contains instructions on how to locate and update this medata.
   Location of Optimized Version of Content: a URL for the optimized version of the inlined content. Many different optimized versions may be designated with different URLs, dependent on the client device, or other request time information. In alternative embodiments, the actual optimized version can be inlined into the API profile, although this makes the profiles larger.
}

An API profile can be expressed in XML, JSON, or any other suitable format. The CDN server 101 can fetch an API profile and cache it for some time period, potentially with an associated TTL, and potentially subject to a later invalidation instruction. It could be fetched in advance or when needed. Upon receipt of an API message from a particular API endpoint, the CDN server can apply the instructions in the API profile to quickly and efficiently find instances of inlined content that can be optimized, verify its identity, and swap the original inlined content for an optimized version thereof (either from the indicated location or from local cache). In this way, much of the processing work needed in Section 2 is done in advance for the CDN server.

3.2 Dynamic Structures of API Messages

Certain API endpoints may be dynamic in how they structure their API responses. For example, while an API endpoint may always respond with a JSON-formatted payload, the arrangement of key-value pairs inlined in the payload may differ across requests. Alternatively, an API endpoint may always have the same arrangement but the content inlined may change frequently. In both of the above cases, the API profile developed by the OAS 104 may become stale. To mitigate this issue, the OAS can be enhanced to calculate probabilities as to whether or not a certain payload format and structure is to be expected from an API endpoint at a given point in time and based on other factors (such as request headers and other configurations), and relay the calculated probabilities along with the API profile to the CDN server.

In practice, this can be implemented by adding to the API profile a confidence score indicating (for each object of interest) the OAS' confidence level that a given API message payload from the API endpoint will have an instance of inlined content that can be optimized at the location specified by the content location instructions.

The process of developing such a confidence score is now described. In one embodiment, the OAS continues to sample requests and responses to various API endpoints and develop the corresponding API profile. If and when the OAS encounters a structurally different payload for an API endpoint which has been inspected previously, the OAS would develop a new profile (and/or modify the old one) pertaining to the newly discovered structure.

In one embodiment, the OAS assigns a counter value, starting from 1, to any profile it develops. When a sampled request-response to an API endpoint satisfies a previously developed profile, the counter value of that profile is incremented by one.

Over a period of time, for each API endpoint, the OAS will have statistics in the form of counter values indicating how many times a response has satisfied a given API profile. These counter values can be used by OAS to calculate the probability of how likely it is that a payload satisfies one profile over another. For example, the probability of an API profile being correct can be calculated as the current counter value of that profile divided by the sum of the counter values of all profiles pertaining to the same API endpoint.

All profiles developed for each of the API endpoints and their probability values could be periodically relayed to the CDN server 101. Upon receipt of an API message from the API endpoint, the CDN server could then consult the top 'N' API profiles (where N is configurable) for optimizing the payload, in the order of highest probabilities first. In the event the profile with the highest probability does not satisfy the actual contents of the payload, the CDN server notifies the OAS for a potential correction and the CDN server could either fallback to attempt the profile with the next highest probability or return the payload unchanged to the client.

If the OAS receives a notification from the CDN server that the profile with a given probability failed, the OAS could then increase its sampling rate for sampling request-responses to a given API endpoint, to improve its discovery.

Here is an example of an API profile with confidence scores and content location instructions, expressed in XML format:

```
<api-endpoint>https://example.com/api/products</api-endpoint>
<payload-info>
  <confidence>0.78</confidence>
  <mime-type>image</mime-type>
  <location>
    <byte-start>100</byte-start>
    <byte-end>28000</byte-end>
  </location>
  <location>
    <byte-start>28100</byte-start>
    <byte-end>90000</byte-end>
  </location>
  <optimization>
    <service>IM</service>
    <compression>50%</compression>
  </optimization>
</payload-info>
<expected-savings>0.15</expected-savings>
```

In lieu of global settings, each CDN content provider customer can be associated with a policy on what confidence levels are necessary to invoke optimization for its API traffic falling under a given API profile. As an example, the above API profile can be associated with the following triggering logic:

```
<api-endpoint>https://example.com/api/products</api-endpoint>
<levels>
  <level>
    <confidence>more than 0.6</confidence>
    <expected-savings>more than 0.2</expected-savings>
    <apply-optimization>true</apply-optimization>
  </level>
  <level>
    <confidence>less than 0.3</confidence>
    <expected-savings>more than 0.4</expected-savings>
    <apply-optimization>false</apply-optimization>
  </level>
</levels>
```

4.0 Additional Use Cases Enabled by Offline-Based Detection & Optimization Techniques When the OAS 104 processes an API message payload, it could develop additional information for inclusion in the profile as to whether the payload could be compressed differently based on the type of objects inlined in the payload. For example, a JSON-formatted payload with mostly numbers inlined therein may be represented in a smaller byte footprint as a Concise Binary Object Representation (CBOR) payload and therefore, the profile developed by the OAS could include instruct the CDN server to perform a CBOR or MSGPACK compression on the payload, as opposed to GZiP or other traditional compression algorithms, for clients supportive of these compressions.

The OAS could be further enhanced to recursively download the content referenced by the URLs inlined in the payloads and inspect them. The inspection of these inlined URLs can be used to develop relationships between various payloads, such that it is possible to estimate that (for example) payload A inlines a URL that may load payload B that may load payload C and so on. When such a pattern is discovered by the OAS, the OAS could include in the API profile a list of URLs that may be soon requested by the client. This could enable a CDN server to not only prefetch, preload, or push dependent content in its cache and on the client, but also load in its cache (or fetch from a peer/parent/ origin) the content that depends upon the preloaded content. Alternatively, the OAS could prepare webpack/web-bundles that contain the sequentially downloaded content. The webpack could be prefetched, pushed, or preloaded on the CDN server or the client.

5.0 Optimization of Referenced Content

The content downloaded from inlined URLs in the API message payload is referred to as referenced content. Referenced content can be analyzed, the content-type determined, and then optimized in the same manner as described earlier for inlined content. The optimized versions can then be ready if and when a client's request for them arrives.

6.0 Additional Embodiments

Those skilled in the art will recognize a variety of variations to the methods and systems described herein. For example, while optimization of inlined content in API messages is typically used in downstream API responses, the teachings hereof also apply, without limitation, to optimize inlined content in upstream API messages that a client is sending (e.g., POSTs) to an API endpoint. Further, while optimizable inlined content typically would be in the payload of an API message, in some cases it may be possible that such content is found in a header.

7.0 Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While, in some cases above, a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 2:
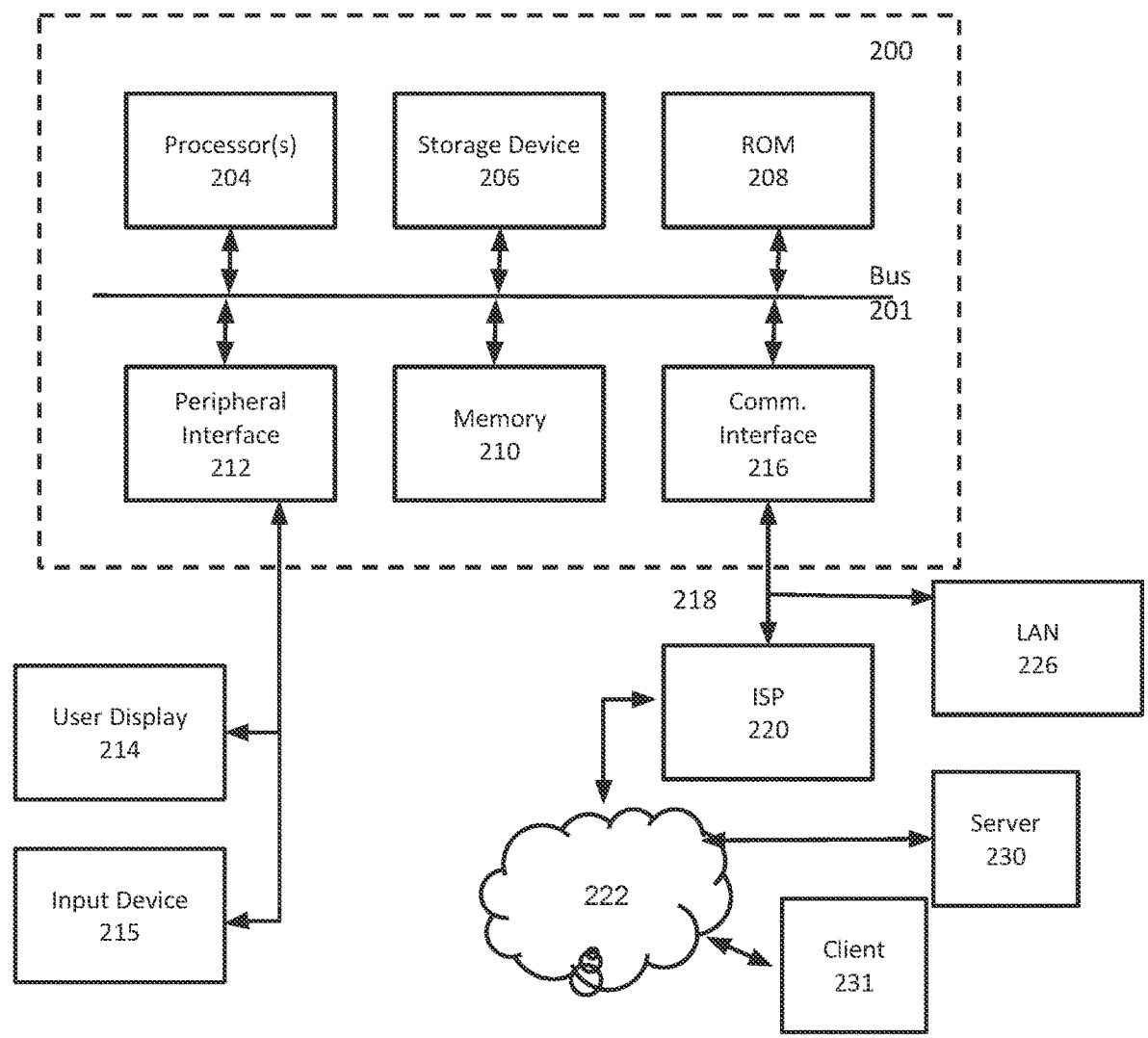

FIG. 2 is a block diagram that illustrates hardware in a computer system 200 upon which such software may run in order to implement embodiments of the invention. The computer system 200 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 200 includes a microprocessor 204 coupled to bus 201. In some systems, multiple processor and/or processor cores may be employed. Computer system 200 further includes a main memory 210, such as a random access memory (RAM) or other storage device, coupled to the bus 201 for storing information and instructions to be executed by processor 204. A read only memory (ROM) 208 is coupled to the bus 201 for storing information and instructions for processor 204. A non-volatile storage device 206, such as a magnetic disk, solid state memory (e.g., flash memory), or optical disk, is provided and coupled to bus 201 for storing information and instructions. Other application-specific integrated circuits (ASICs), field programmable gate arrays (FPGAs) or circuitry may be included in the computer system 200 to perform functions described herein.

A peripheral interface 212 may be provided to communicatively couple computer system 200 to a user display 214 that displays the output of software executing on the computer system, and an input device 215 (e.g., a keyboard, mouse, trackpad, touchscreen) that communicates user input and instructions to the computer system 200. However, in many embodiments, a computer system 200 may not have a user interface beyond a network port, e.g., in the case of a server in a rack. The peripheral interface 212 may include interface circuitry, control and/or level-shifting logic for local buses such as RS-485, Universal Serial Bus (USB), IEEE 1394, or other communication links.

Computer system 200 is coupled to a communication interface 216 that provides a link (e.g., at a physical layer, data link layer,) between the system bus 201 and an external communication link. The communication interface 216 provides a network link 218. The communication interface 216 may represent an Ethernet or other network interface card (NIC), a wireless interface, modem, an optical interface, or other kind of input/output interface.

Network link 218 provides data communication through one or more networks to other devices. Such devices include other computer systems that are part of a local area network (LAN) 226. Furthermore, the network link 218 provides a link, via an internet service provider (ISP) 220, to the Internet 222. In turn, the Internet 222 may provide a link to other computing systems such as a remote server 230 and/or a remote client 231. Network link 218 and such networks may transmit data using packet-switched, circuit-switched, or other data-transmission approaches.

In operation, the computer system 200 may implement the functionality described herein as a result of the processor executing code. Such code may be read from or stored on a non-transitory computer-readable medium, such as memory 210, ROM 208, or storage device 206. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 218 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method performed at a cache server for optimizing content inlined in API messages, comprising:
   receiving, from an application programming interface (API), an API message that the API is sending to a client, the API message using an arbitrary format to send content;
   obtaining a set of content location instructions associated with the API;
   applying the set of content location instructions to the API message, so as to locate an instance of inlined content within the arbitrary format of the API message;
   after locating the instance of inlined content, taking at least one action from the following group of actions:
   i) searching a local cache for an optimized version of the instance of inlined content, and upon finding the optimized version, swapping the optimized version into the API message for the instance of inlined content,
   ii) requesting an optimized version of the instance of inlined content from a remote repository, and upon receiving the optimized version, swapping the optimized version into the API message for the instance of inlined content, and,
   iii) initiating an optimization process to create an optimized version of the instance of inlined content;
   wherein the API is associated with an API endpoint that comprises at least part of a URL, and the set of content location instructions are associated therewith.

2. The method of claim 1, wherein the set of content location instructions comprise at least one of: a byte offset and a byte range.

3. The method of claim 1, wherein the set of content location instructions designate a logical location of the instance of inlined content within the API message.

4. The method of claim 3, wherein the designated logical location is expressed as at least one of the following: a key-value pair, a row name, a column name, a tag name, a subpath.

5. The method of claim 1, wherein the instance of inlined content is located in a payload of the API message.

6. The method of claim 1, wherein the optimization process is executed out of band.

7. The method of claim 1, further comprising: initiating the optimization process in response to a failure to find the optimized version in the local cache or the remote repository.

8. The method of claim 1, wherein the optimized version is adapted for the client.

9. The method of claim 1, wherein the API message has a payload that uses a standardized data interchange format.

10. The method of claim 9, wherein the standardized data interchange format comprises the arbitrary format.

11. The method of claim 9, wherein the data interchange format comprises at least one of: JSON, XML, CSV, TSV, and, a delimiter-separated-value format other than CSV or TSV.

12. The method of claim 1, wherein the instance of inlined content has a type selected from the group of types that is: image, HTML, CSS, Javascript, URL, numerals.

13. A method performed at a cache server for optimizing content inlined in API messages, comprising:
   receiving, from an application programming interface (API), an API message that the API is sending to a client, the API message using an arbitrary format to send content;
   obtaining a set of content location instructions associated with the API;
   applying the set of content location instructions to the API message, so as to locate an instance of inlined content within the arbitrary format of the API message;
   after locating the instance of inlined content in the API message:
      obtaining a set of content verification instructions associated with the instance of inlined content,
      applying the set of content verification instructions to verify an identity of the instance of inlined content, and,
      upon successful verification of the instance of inlined content, taking at least one action from the following group of actions:
      i) searching a local cache for an optimized version of the instance of inlined content, and upon finding the optimized version, swapping the optimized version into the API message for the instance of inlined content,
      ii) requesting an optimized version of the instance of inlined content from a remote repository, and upon receiving the optimized version, swapping the optimized version into the API message for the instance of inlined content, and,
      iii) initiating an optimization process to create an optimized version of the instance of inlined content.

14. The method of claim 13, wherein the set of content verification instructions comprise instructions to hash at least a portion of the instance of inlined content and compare the result to a given hash value.

15. A method performed at a cache server for optimizing content inlined in API messages, comprising:
   receiving, from an application programming interface (API), an API message that the API is sending to a client, the API message using an arbitrary format to send content;
   obtaining a set of content location instructions and a confidence score associated with the API;
   the confidence score indicating a confidence that the API message contains content locatable by the set of content location instructions;
   determining whether to apply the set of content location instructions based at least in part on the confidence score;
   upon a determination to apply the set of content location instructions, applying the set of content location instructions to the API message, so as to locate an instance of inlined content within the arbitrary format of the API message;

after locating the instance of inlined content, taking at least one of the following actions:
  i) searching a local cache for an optimized version of the instance of inlined content, and upon finding the optimized version, swapping the optimized version into the API message for the instance of inlined content,
  ii) requesting an optimized version of the instance of inlined content from a remote repository, and upon receiving the optimized version, swapping the optimized version into the API message for the instance of inlined content, and,
  iii) initiating an out of band process to create an optimized version of the instance of inlined content.

16. The method of claim 15, further comprising:
observing, over a time period, multiple API messages sent by the API;
learning the location of inlined content in the API messages from the observed multiple API messages; and,
generating the confidence score as a probability that a given API message will have inlined content locatable based on the learning.

17. The method of claim 16, wherein the confidence score is expressed as a probability.

18. A system for optimizing content inlined in API messages, comprising:
one or more servers having circuitry forming at least one processor and memory holding program instructions for execution on the at least one processor to operate to the one or more servers to:
receive, from an application programming interface (API), an API message that the API is sending to a client, the API message using an arbitrary format to send content;
obtain a set of content location instructions associated with the API;
apply the set of content location instructions to the API message, so as to locate an instance of inlined content within the arbitrary format of the API message;
after locating the instance of inlined content, take at least one action from the following group of actions:
  i) search a local cache for an optimized version of the instance of inlined content, and upon finding the optimized version, swapping the optimized version into the API message for the instance of inlined content,
  ii) request an optimized version of the instance of inlined content from a remote repository, and upon receiving the optimized version, swapping the optimized version into the API message for the instance of inlined content, and,
  iii) initiate an optimization process to create an optimized version of the instance of inlined content;
wherein the API is associated with an API endpoint that comprises at least part of a URL, and the set of content location instructions are associated therewith.

19. A system for optimizing content inlined in API messages, comprising:
one or more servers having circuitry forming at least one processor and memory holding program instructions for execution on the at least one processor to operate to the one or more servers to:
receive, from an application programming interface (API), an API message that the API is sending to a client, the API message using an arbitrary format to send content;
obtain a set of content location instructions associated with the API;
apply the set of content location instructions to the API message, so as to locate an instance of inlined content within the arbitrary format of the API message;
after locate the instance of inlined content in the API message:
obtain a set of content verification instructions associated with the instance of inlined content,
apply the set of content verification instructions to verify the identity of the instance of inlined content, and,
upon successful verification of the instance of inlined content, take at least one action from the following group of actions:
  i) search a local cache for an optimized version of the instance of inlined content, and upon finding the optimized version, swapping the optimized version into the API message for the instance of inlined content,
  ii) request an optimized version of the instance of inlined content from a remote repository, and upon receiving the optimized version, swapping the optimized version into the API message for the instance of inlined content, and,
  iii) initiate an optimization process to create an optimized version of the instance of inlined content.

20. A system for optimizing content inlined in API messages, comprising:
one or more servers having circuitry forming at least one processor and memory holding program instructions for execution on the at least one processor to operate to the one or more servers to:
receive, from an application programming interface (API), an API message that the API is sending to a client, the API message using an arbitrary format to send content;
obtain a set of content location instructions and a confidence score associated with the API;
the confidence score indicating a confidence that the API message contains content locatable by the set of content location instructions;
determining whether to apply the set of content location instructions based at least in part on the confidence score;
upon a determination to apply the set of content location instructions, apply the set of content location instructions to the API message, so as to locate an instance of inlined content within the arbitrary format of the API message;
after locating the instance of inlined content, take at least one of the following actions:
  i) search a local cache for an optimized version of the instance of inlined content, and upon finding the optimized version, swapping the optimized version into the API message for the instance of inlined content,
  ii) request an optimized version of the instance of inlined content from a remote repository, and upon receiving the optimized version, swapping the optimized version into the API message for the instance of inlined content, and, iii) initiate an out of band process to create an optimized version of the instance of inlined content.

* * * * *